United States Patent [19]
Hagenlocher et al.

[11] 3,731,126
[45] May 1, 1973

[54] ELECTRICAL MACHINE WITH SHIELDED CIRCUIT PARTS

[75] Inventors: Walter Hagenlocher, Leonberg; Georg Binder, Stuttgart, both of Germany

[73] Assignee: Robert Bosch GmbH, Stuttgart, Germany

[22] Filed: Oct. 7, 1971

[21] Appl. No.: 187,432

[30] Foreign Application Priority Data

Oct. 12, 1970 Germany..................P 20 49 962.1

[52] U.S. Cl. ...................310/68, 310/88, 310/239
[51] Int. Cl. .................................................H02k 5/10
[58] Field of Search....................310/88, 68, 68 D, 310/239

[56] References Cited

UNITED STATES PATENTS

| | | | |
|---|---|---|---|
| 3,629,630 | 12/1971 | Cotton et al. | 310/68 |
| 3,584,248 | 6/1971 | Higashino et al. | 310/239 X |
| 3,233,130 | 2/1966 | Bates | 310/88 |

FOREIGN PATENTS OR APPLICATIONS

| | | | |
|---|---|---|---|
| 1,363,715 | 5/1964 | France | 310/68 D |

Primary Examiner—D. F. Duggan
Attorney—Michael S. Striker

[57] ABSTRACT

An alternating current generator is provided with an insulating casing closed by an end cover of the housing and supporting circuit parts while enveloping slip rings and contact brushes so that the same are protected from dirt and splashed water.

27 Claims, 30 Drawing Figures

INVENTORS
Walter HAGENLOCHER
Georg BINDER their ATTORNEY

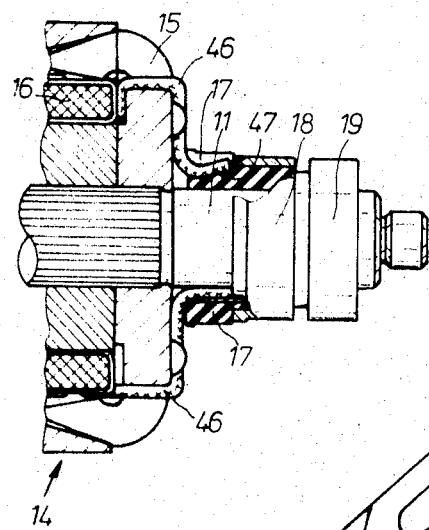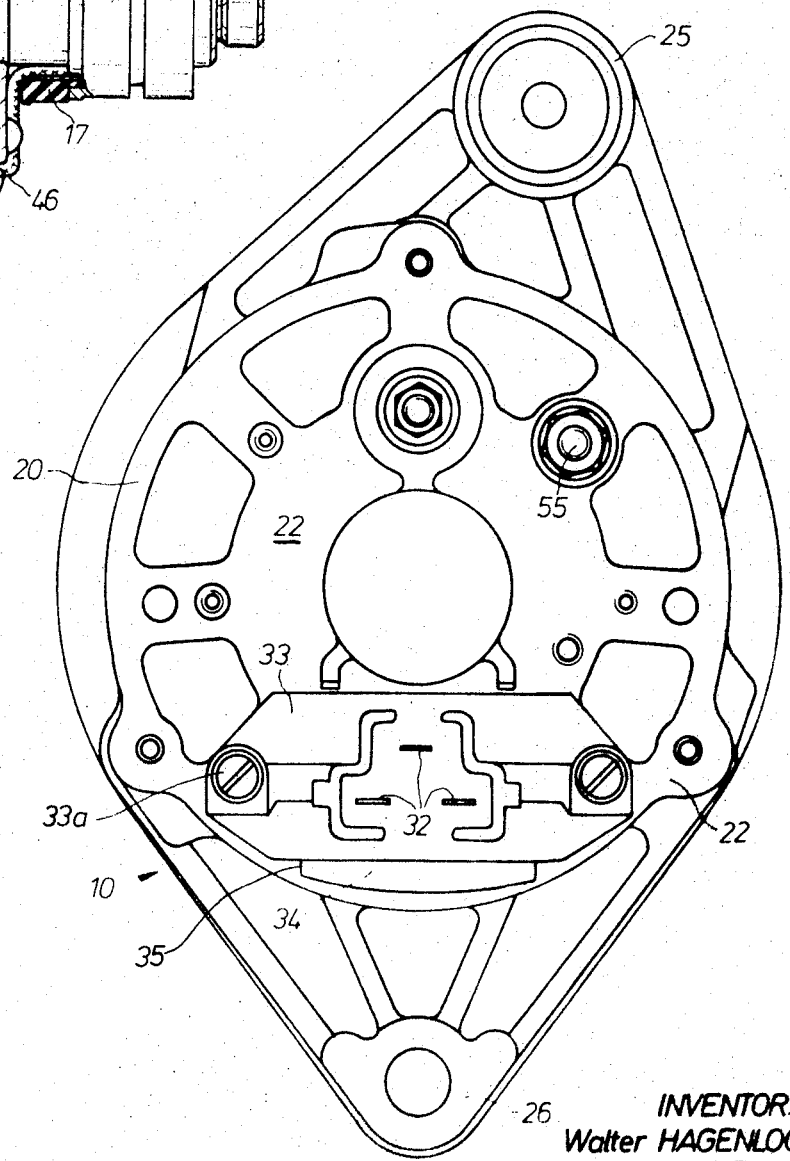

INVENTORS
Walter HAGENLOCHER
Georg BINDER

By their ATTORNEY

INVENTORS
Walter HAGENLOCHER
Georg BINDER

By
their ATTORNEY

INVENTORS
Walter HAGENLOCHER
Georg BINDER

By
their ATTORNEY

INVENTORS
Walter HAGENLOCHER
Georg BINDER

By their ATTORNEY

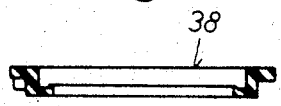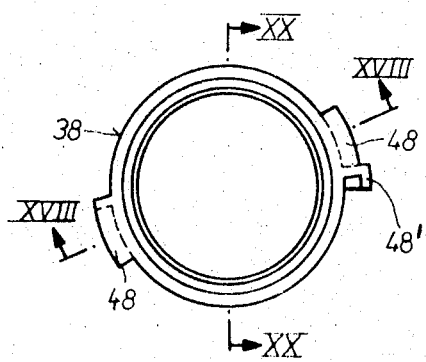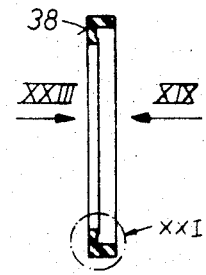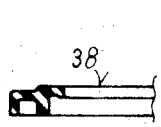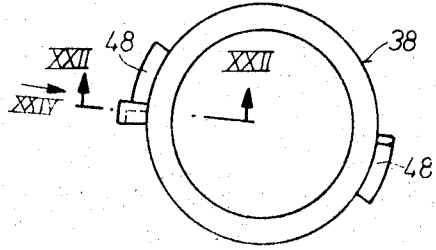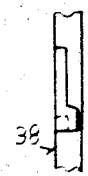

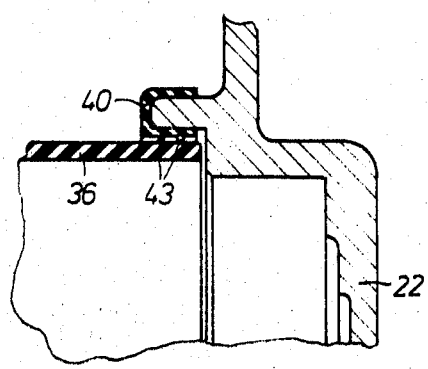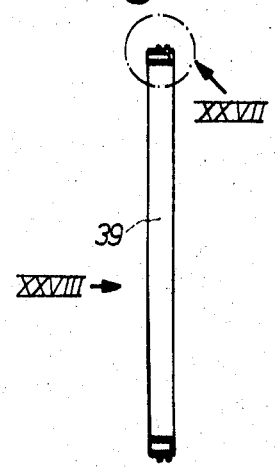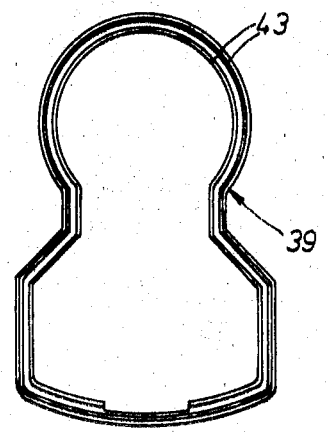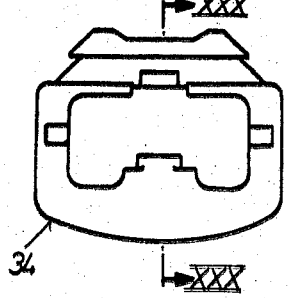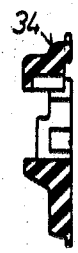

ELECTRICAL MACHINE WITH SHIELDED CIRCUIT PARTS

BACKGROUND OF THE INVENTION

The present invention relates to an alternating current generator, particularly a three phase generator for the electrical system of a motorcar. Generators of this type have slip rings and contact brushes to supply current to the rotor, and include a cooling body or plate supporting a rectifier apparatus. An insulating plate supports circuit parts in the constructions of the prior art.

Generators of this type are usually manufactured with an open housing structure which permits the passage of air for cooling the machine. Unshielded electrical machines of this type cannot be used under conditions in which a great amount of water and dirt enters the generator, and causes increased wear of the rotary parts. It is known to completely shield generators against the entry of dust, dirt and water, but such an arrangement is very expensive, and the amount of sealing means required is so great that the cost of the generator according to the prior art exceeds the costs which would be justifiable for unfavorable working conditions, which are not extremely bad.

SUMMARY OF THE INVENTION

It is one object of the invention to shield sensitive parts of a standard open housing generator against sprayed water and dirt so that the generator can be used under conditions in which the expensive fully protected construction has been used in the prior art. This is particularly the case for tractors, mobile cranes, automobiles and trucks when the generator has to be placed in an unfavorable position, or when the respective vehicle is used in regions in which the air has a high dust content.

With these objects in view, the present invention provides a casing consisting of insulating material, and enveloping and protecting sensitive electric parts such as contact brushes and slide rings, while supporting other parts of the electric circuit of the generator.

Generally speaking an electrical machine according to an embodiment of the invention, comprises a metal housing structure; electric stator means secured to the housing structure; electric rotor means mounted in the housing structure for rotation; electric circuit means including slip ring means secured to the stator or rotor, and contact brush means secured to the rotor or stator, respectively; and stationary insulating casing means secured to the housing structure supporting part of the circuit means and enveloping at least the slip rings and contact brushes for protecting the same from contamination by dust, dirt and splashed water.

In the preferred embodiment of the invention, the insulating casing is open toward an adjacent end cover of the housing structure, in which a bearing is mounted, and the bearing shield part of the end cover is used for closing the insulating casing. It is particularly advantageous when the brush holder of the generator is completely enveloped by the insulating case, except for a flange-shaped attaching portion which projects out of the housing of the generator. A simple structure is obtained by providing a pot-shaped bearing shield in which the bearing is mounted, and to close the space within the insulating casing partly by the bearing shield so that the bearing is also located in the protected space within the insulating casing.

It is also an object of the invention to use as many parts of an unshielded air cooled generator of standard construction as possible. For this reason, the brush holder, which is within the housing enveloped by the insulating casing, is provided with a flange-shaped extension by which it is secured to the outside of the respective bearing shield of the generator, sealed by sealing means. Particularly if the opening in the bearing shield of the generator is not completely covered by the flange-shaped extension of the brush holder, it is advantageous to provide a closure part consisting of an elastic material which is pressed into an opening of the respective end cover and bearing shield, and held in this position by the flange-shaped extension of the brush holder after the same has been secured to the end cover.

The insulating casing is preferably manufactured by press molding or injection molding, and is sealed from the rotating rotor. In a preferred construction, the insulating casing has a bottom wall with a circular opening through which the rotor shaft and the slip rings can pass. The rotor shaft has in the region of the opening, a cylindrical flange consisting of a synthetic material and fitting into the opening. The conductors between the windings and the slip rings, are preferably embedded in the material of the cylindrical flange in suitable notches which are then filled with the synthetic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a fragmentary axial sectional view illustrating the connecting wires between the rotor winding and the slip rings on an enlarged scale;

FIG. 3 is an end view of the generator and one end cover thereof, taken in the direction of the arrow III in FIG. 1;

FIG. 18 is a cross-sectional view taken on line XVIII—XVIII in FIG. 19, and illustrating a holding ring for a felt seal;

FIG. 19 is an end view of the holding ring taken in the direction of the arrow XIX in FIG. 20;

FIG. 20 is a sectional view taken on line XX—XX in FIG. 19 and illustrating the holding ring;

FIG. 21 is a fragmentary sectional view illustrating a portion of the holding ring indicated by arrow XXI in FIG. 20;

FIG. 22 is a fragmentary sectional view taken on line XXII—XXII in FIG. 23;

FIG. 23 is a view taken in the direction of the arrow XXIII in FIG. 20, and illustrating the holding ring;

FIG. 24 is a fragmentary view illustrating a portion of the holding ring as viewed in the direction of the arrow XXIV in FIG. 23;

FIG. 25 is a fragmentary sectional view illustrating the sealing between the insulating casing and the bearing shield of the housing;

FIG. 26 is a sectional view illustrating a sealing member adapted to be mounted at one end of the insulating casing;

FIG. 27 is a fragmentary view illustrating on an enlarged scale the portion XXVII of FIG. 26;

FIG. 28 is a view taken in the direction of the arrow XXVIII in FIG. 26 and illustrating the shape of the sealing member;

FIG. 29 is a view illustrating a closure part for closing the housing and the insulating case; and FIG. 30 is a fragmentary sectional view taken on line XXX—XXX in FIG. 29.

DESCRIPTION OF THE PREFERRED EMBODIMENT

Figure 1:
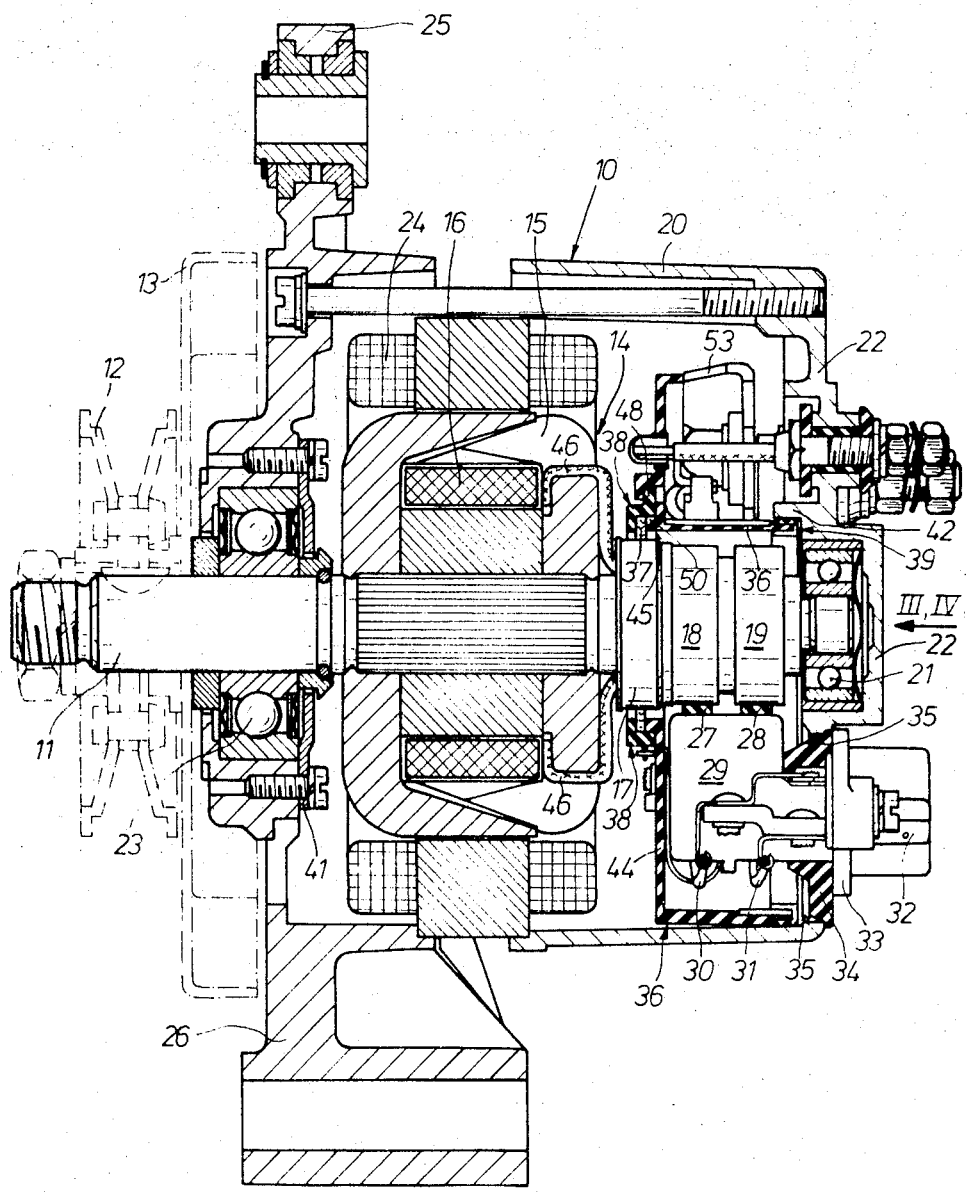
FIG. 1 is a longitudinal axial sectional view illustrating an alternating current generator with an insulating casing in accordance with an embodiment of the invention.
Figure 4:
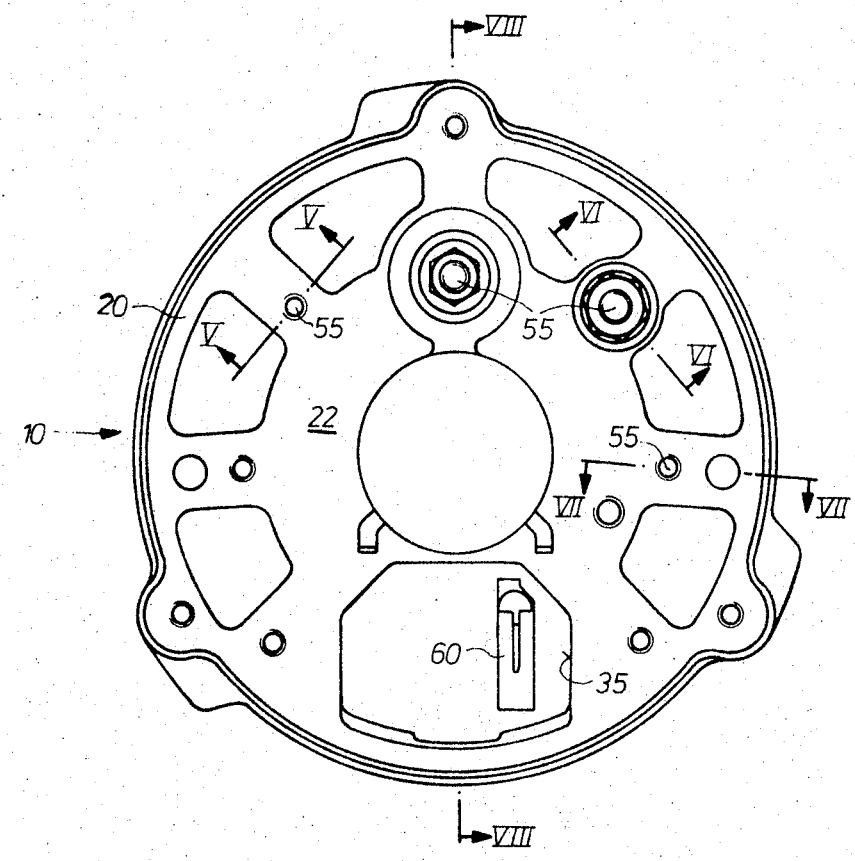
FIG. 4 is an end view taken in the direction of the arrow IV in FIG. 1, and illustrating only the end cover.
Figure 5:
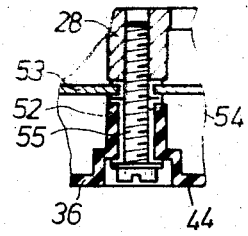
FIG. 5 is a fragmentary sectional view taken on line V—V in FIG. 4, and illustrating the attachment of a contact brush and of a cooling body to the insulating casing.
Figure 6:
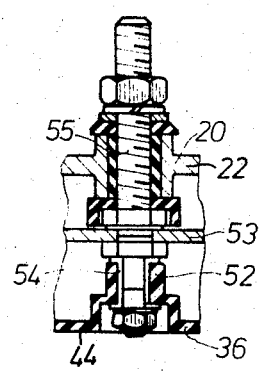
FIG. 6 is a fragmentary sectional view taken on VI–VI in FIG. 4, and illustrating the attachment of the insulating casing to the end cover.
Figure 7:
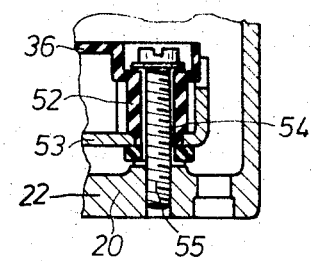
FIG. 7 is a fragmentary sectional view taken on line VII—VII in FIG. 4, and illustrating the attachment of the insulating casing and of a cooling body to the end cover of the housing.

The following description of the drawing refers mainly to FIG. 1, but reference will be made to FIGS. 2 to 30 where the described structure is shown in greater detail in FIGS. 2 to 30.

An alternating current generator 10 is constructed as a claw pole generator. Rotor shaft 11 is driven by a combustion engine, preferably, the engine of a motorcar, and carries a pulley 12, a fan 13, and a rotor 14 with claw poles 15, a winding 16, a cylindrical flange 17 consisting of a synthetic material, and slip rings 18 and 19. Shaft 11 is mounted in the metal housing 20, and is supported by ball bearings 21 and 23 of which ball bearing 21 is located in a pot-shaped portion of bearing shield 22, while bearing 23 is mounted at the other end of housing 20 covered by a protecting cover 41 secured by screws to housing 20.

The generator 10 has a stator with a winding 24, and housing 20 includes two attachment brackets 25 and 26 by which the entire generator can be mounted on the frame of the vehicle. Two stationary contact brushes 27 and 28 slip on slide rings 18 and 19 and are guided in a brush holder 29 connected by flexible wires 30, 31 with flat connectors 32, see also FIG. 3, which are located in a wide flange 33 of holder 29. Screws secure the flange 33 to the bearing shield and end cover 22 of housing 20. Between the flange 33 and the metal end cover 22, a closure part 34 consisting of rubber or synthetic material is inserted, which is pressed into an opening 35 in the end cover or bearing shield 22 of housing 20. When brush holder 29 is secured by screws 33a passing through flange 33, the insulating closure member 34 is reliably secured to the housing.

Instead of flat connectors 37 for connecting wires to the voltage regulator of the generator 10, the brush holder 29 can also be part of an electronic voltage regulator which would then be mounted directly on the flange 33. It is also possible to construct a voltage regulator with sockets so that it can be directly mounted on the plugs 32 without requiring connecting wires.

Figure 8:
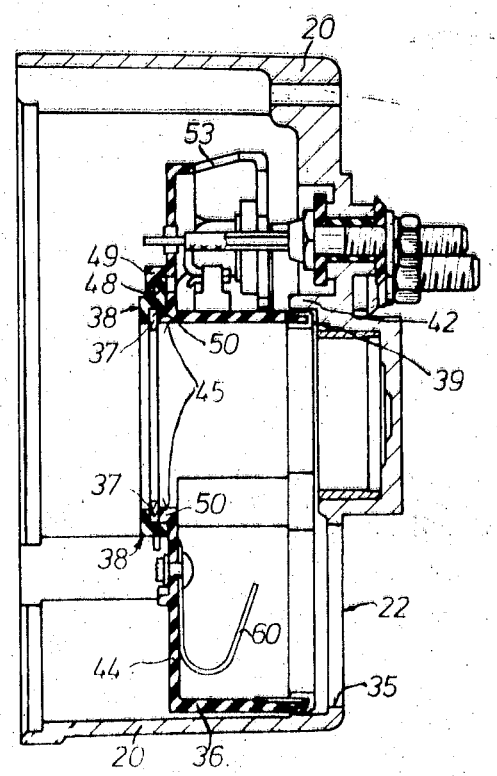
FIG. 8 is a longitudinal section taken on line VIII—VIII in FIG. 4, and illustrating the support of a cooling body and of the insulating case on the end cover.
Figure 9:
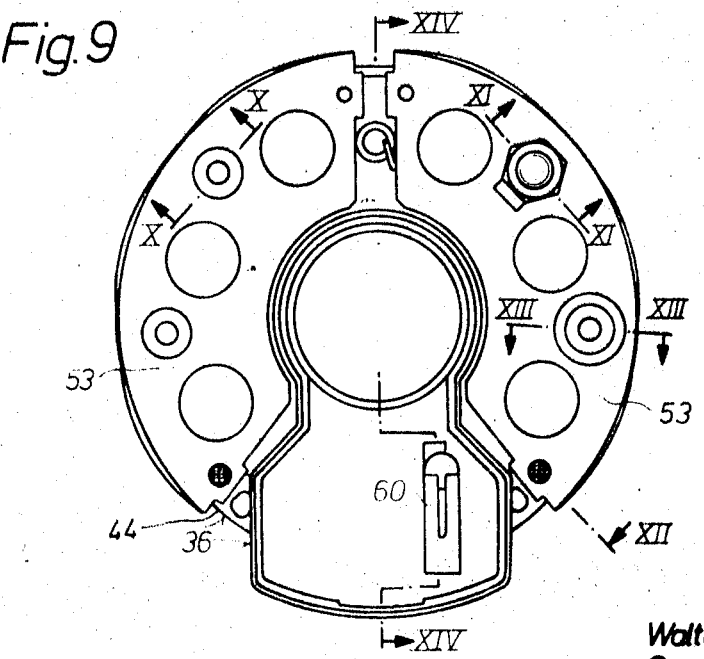
FIG. 9 is an end view illustrating the insulating casing and cooling bodies secured to the same.
Figure 14:
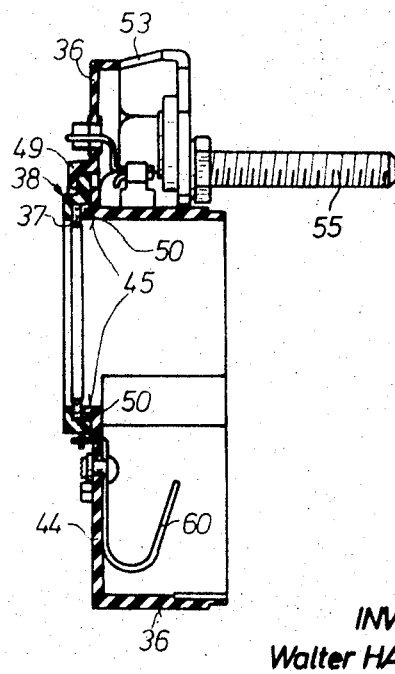
FIG. 14 is a fragmentary sectional view taken on line XIV—XIV in FIG. 9, and illustrating the insulating casing with means for attaching the cooling body.
Figure 15:
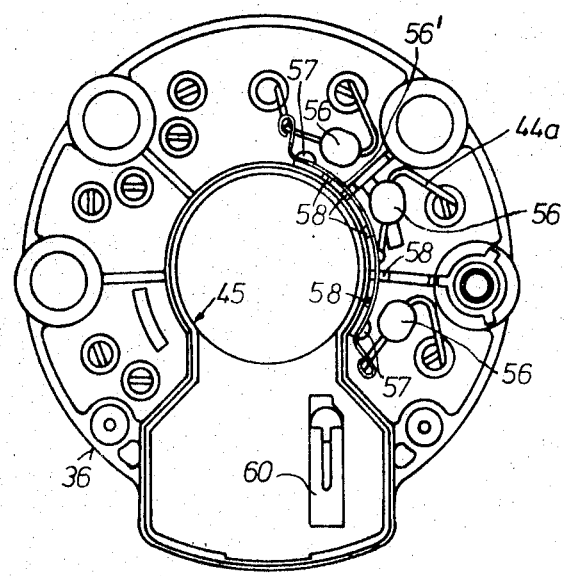
FIG. 15 is an end view illustrating the insulating casing viewed in the direction of the arrow in FIG. 17, the cooling body being omitted for the sake of clarity.
Figure 16:
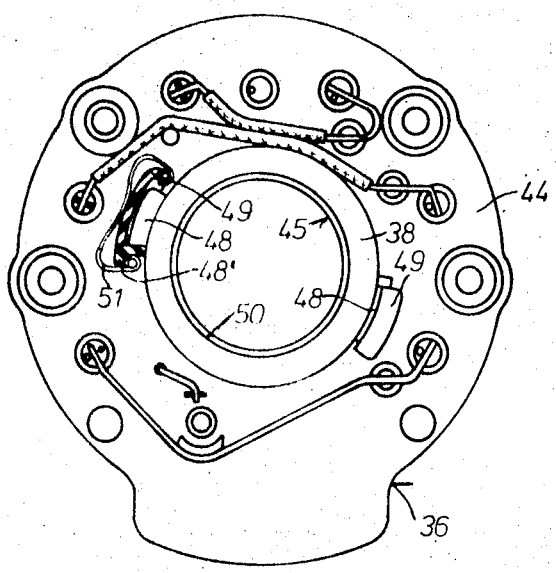
FIG. 16 is a rear view of the insulating casing taken in the direction of the arrow XVI in FIG. 17, and illustrating circuit parts supported by the bottom wall of the insulating casing.
Figure 17:
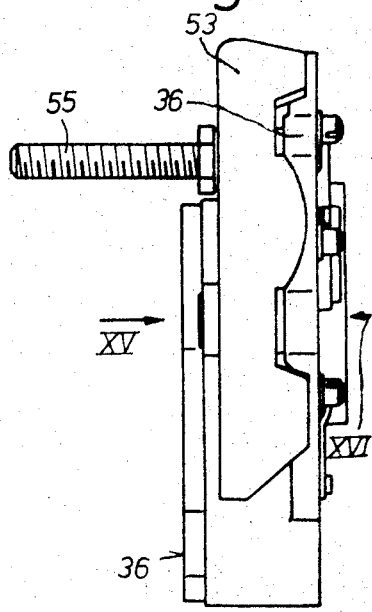
FIG. 17 is a side view of the insulating casing with cooling bodies supported thereon.

An insulating casing 36, which is separately shown in FIGS. 15, 16, and 17, and also shown in FIGS. 8, 9, and 14, forms together with closure part 34, see FIGS. 3, 29 and 30, and with a felt sealing member 37, a holding ring 38, see FIGS. 18 to 24, and with sealing means 39, see FIGS. 26, 27, 28 or 40, see FIG. 25, a dust, dirt and splash water protective space for enveloping sensitive and delicate parts of the generator. Particularly contact brushes 27, 28, slip rings 18 and 19, and ball bearing 21 are protected by the insulating casing 36 in the illustrated embodiment. The other bearing 23 is protected by a separate cover 41. The insulating casing 36 is open toward the bearing shield 22 of generator housing 20, and a portion of bearing shield 22 is used for closing the space within the insulating casing 36, as best seen in FIG. 8. The required sealing is either obtained by a sealing member 39, see FIGS. 8 and 26 to 28 which is pushed onto the part of insulating casing 36 facing bearing shield 22, or by a sealing member 40 shown in FIG. 25 to be mounted on a rib 42 projecting inward from bearing shield 22, as shown in FIGS. 8 and 25. Sealing lips 43, see FIGS. 27 and 28, improve the sealing effect by the sealing member 39. In many cases, however, it is sufficient to obtain the required sealing between the insulating casing 36 and the corresponding portion of bearing shield 22, by precise dimensioning of the respective parts. Due to the manufacturing tolerances, a completely exact fitting of the parts is not possible.

In the embodiment illustrated in the drawing, the brush holder 29 is also fully enveloped by the insulating casing 36, and only its attaching portion projects out of the sealed chamber within insulating casing 36. This construction saves additional sealing means for the brush holder 29, since an opening must le provided in the bearing shield 22 for inserting the brush holder 29 during assembly. As noted above, this opening 35, see FIGS. 4 and 8, can be closed by closure part 34 which prevents entering of dirt and water into the insulating casing 36. By enclosing the bearing 21 into the protective space additional parts can be saved. As particularly shown in FIGS. 15 and 16, insulating casing 36 has a large bottom wall 44 which is suitable for supporting electric circuit parts 40a, as particularly shown in FIGS. 15 and 16. A circular opening 45, see FIGS. 15 and 16, is provided in bottom wall 44 for the passage of the shaft 11 and of the slip rings 18 and 19. In the region of opening 45, rotor shaft 11 has a cylindrical flange 17 consisting of a synthetic material which has the same diameter as the opening 45. Flange 17 has recesses 47 into which the connecting wires 46 are inserted, see FIG. 2, whereupon the recesses are filled with synthetic material in softened condition. The holding ring 38, see FIGS. 18 to 24, is pressed during assembly against the flange 17 of rotor 14, and abuts the same, after a certain time of use, with a negligibly small play. The securing of the felt seal ring 37 obtained by pressing the sealing ring into the gap between a cylindrical projection 50 projecting from the bottom wall 44 of the insulating cases 36, and holding ring 38, as shown in FIGS. 8 and 14. The holder ring 38 also consists of an insulating material, and has a rectangular cross-section which is changed to a Z-shaped cross-section in the region of the projections 48. In order to prevent a release of holder ring 38, a safety spring 51, see FIG. 16 is provided which abuts the rectangularly bent projection 48' of the holder ring 38, and on the other hand on the projecting ends of the holding segments 49 provided on the insulating casing 36.

The bayonet attachments 48, 49 are arrested by spring 51 so that they cannot separate even when subjected to strong jolts.

Instead of the spring 51, arresting noses can be provided on the insulating casing 36 and on the holder ring 38, and an adhesive attachment is also possible.

In the generator shown in the illustrated example, the projection 48 on holding ring 38, see FIGS. 19 and 23, and the holder segments 49 of the insulating casing 36 are offset an angle of about 180°. Particularly at high stress, that is when a higher pressure is required for the felt ring, the holder ring 38 can be secured by three arresting projections, which are spaced 120° from each other. Instead of using the felt ring 37 between the rotor 14 and the insulating casing 36, the remaining ring gap can be eliminated by a corresponding fitting of the cylindrical flange 17. The projection 50, see FIGS. 8 and 14 on the insulating casing 36 has to be extended in this case, so that the remaining annular gap is only a few tenths of a millimeter wide.

Figure 10:
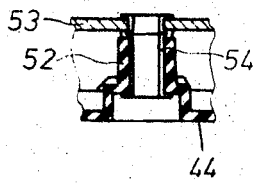
FIG. 10 is a fragmentary sectional view taken on line X—X in FIG. 9, and illustrating the attachment of a cooling body to the insulating casing.
Figure 11:
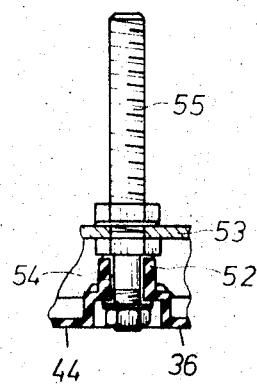
FIG. 11 is a fragmentary sectional view taken on line XI—XI in FIG. 9, and illustrating another attachment of the cooling body.
Figure 12:
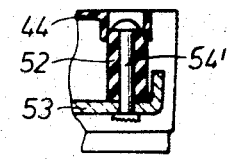
FIG. 12 is a fragmentary sectional view taken on line XII-XII in FIG. 9 and illustrating a further attachment of the cooling body to the bottom plate of the insulating casing.
Figure 13:
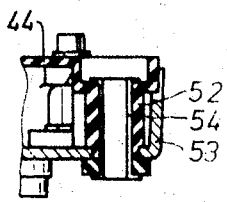
FIG. 13 is a sectional view taken on line XIII—XIII in FIG. 9, and illustrating another attachment of the cooling body.

The bottom wall 44 of the insulating casing 36 has outwardly projecting sleeves 52, see FIGS. 5, 6 and 7, and FIGS. 8, 14 and 17, on which cooling bodies or plates 53 are secured by hollow rivets 54 or solid rivets 54', as shown in FIGS. 10 and 12. The openings in the hollow rivets 54 serve as passages for the attachment screws 55 by which the insulating casing 36 is secured to the bearing shield 22 together with the cooling bodies 53. This arrangement results in an exact centering of the insulating casing 36 in relation to the bearing shield 22, which is necessary for sealing the rotor shaft 11 without depending on exact tolerances. Only the tolerances of the generator housing 20 influence the position of the rectifier means which are mounted on the insulating casing 36, as shown in FIG. 15. The arrangement of the holes in the generator housing for the passage of the attaching screws 55 is the only source of inaccuracies, while greater tolerances are permitted for the manufacture of cooling bodies 53, which constitutes a further advantage of the invention.

For reasons of space, it is necessary to arrange the diodes 56 on a special carrier plate 56', as shown in FIG. 15. For securing of carrier plate 56', the bottom wall 44 of the insulating casing 36 has inwardly directed staggered ribs 57 and studs 58 between which the normally planar carrier plate 56' is inserted in a wavy bent condition.

In the illustrated embodiment of the insulator casing 36 shown particularly in FIGS. 15, 16 and 17, the bottom wall 44 projects beyond the central casing portion 50, and carries circuit parts such as wires, and also the rectifier cooling body 53. Bottom wall 44 is also used for securing insulating casing 36 to the bearing shield 22 of the generator housing 20. The electric connection between the brush holder 29 and the electric circuit parts 44a mounted on the bottom wall 44, see FIGS. 15 and 16, is obtained by a resilient contact 60 constructed as a U-shaped spring 60, see also FIG. 8.

In accordance with the invention, a dust and moisture protected space for slide rings and carbon brush contacts is formed mainly by the insulating casing 36 which is integral with a bottom wall 44 on which circuit parts are mounted. Only one side of the space within the insulating casing 36 is closed by the bearing shield 22, and partly by the closure plate 34. The construction is very simple, and is far less expensive than completely shielded generators according to the prior art. The most delicate parts of the generator are protected from dirt and moisture, without any substantial change in the standard construction of the generator which is used under more favorable conditions when no damage by water or dirt is to be expected. The arrangement not only results in reduction of the cost of manufacture, but also in a very compact construction of the generator as compared with the fully encased and shielded generator.

It is possible to transform a standard generator into a generator according to the invention by exchanging the rotor and inserting the insulating casing with the rectifier arrangement. Sealing means can be provided or removed, for obtaining the sealing of the brush holder, as explained above. When a safety spring 51 is used for preventing loosening of the holding ring 38, as shown in FIG. 16, the felt seal 37 can be easily exchanged.

It will be understood that each of the elements described above, or two or more together, may also find a useful application in other types of an electric generator for the electric system of a motorcar differing from the types described above.

While the invention has been illustrated and described as embodied in an electric generator provided with an insulating casing for protecting the slip rings and the contact brushes from dirt and water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Electrical machine with shielded circuit parts, comprising a metal housing structure including a bearing shield; a bearing inside said bearing shield; electric stator means secured in said housing structure; electric rotor means including a shaft having a shaft end mounted in said bearing for rotation about an axis; a stationary pot-shaped insulating casing means having a bottom plate transverse to said axis formed with a circular opening surrounding and slidingly engaging a portion of said shaft spaced axially inward from said bearing, and annular side wall means closed by said bearing shield on the side remote from said bottom wall; and slip ring means, contact brush means, and brush holder means located in said insulating casing means between said bottom wall and said bearing shield protected from contamination by dust, dirt, and water.

2. Machine as claimed in claim 1 comprising an annular sealing ring surrounding said opening in said bottom plate and in contact with said shaft portion; a holding ring for holding said sealing ring on said bottom plate; and sealing means between said bearing shield and said annular side wall means.

3. Machine as claimed in claim 1 wherein said holding ring has first bayonet projections, and wherein said bottom plate has second bayonet projections engaging said first bayonet projections to form bayonet joints.

4. Machine as claimed in claim 3 including spring clamps embracing said bayonet joints secure to said first and second bayonet projections together.

5. Machine as claimed in claim 1 wherein said bearing shield has an inner part-circular rib engaging said side wall of said insulating casing for centering said insulating casing on said shaft.

6. Machine as claimed in claim 5 comprising a sealing member having a U-shaped cross section and mounted on said inner rib engaging said side wall means.

7. Machine as claimed in claim 6 wherein said sealing member has sealing lips.

8. Machine as claimed in claim 5 including a sealing member having a U-shaped cross section and mounted on said side wall means.

9. Machine as claimed in claim 1 wherein said insulating casing means is made of a cast insulating material.

10. Machine as claimed in claim 1 wherein said slip ring means is mounted on said shaft between said bottom plate and said bearing; wherein said bearing shield is an end wall of said housing structure having an opening; and wherein said casing means include an insulating closure part for said opening in said end wall, and means for mounting said brush holder on said insulating closure part.

11. Electrical machine with shielded circuit parts comprising a metal housing structure; electric stator means secured in said housing structure; electric rotor means including a shaft; a bearing in said housing structure supporting one end of said shaft for rotation; an insulating casing means including a casing and a bottom wall projecting from said casing, said bottom wall having a circular opening, said shaft having a cylindrical flange slidingly fitting into said circular opening; and electric circuit means including slip ring means mounted on said shaft between said cylindrical flange and said bearing, and contact brush means supported on said insulating casing means, said insulating casing means enveloping at least said slip ring means and said contact brush means for protecting the same from contamination by dust, dirt, and splashed water.

12. Electrical machine as claimed in claim 11 wherein said housing structure includes at least one pot-shaped bearing shield; bearing for said rotor means being mounted in said pot-shaped bearing shield; and wherein said insulating casing means is open toward said bearing shield and is closed by the same to envelop also said bearing.

13. Electrical machine as claimed in claim 12 wherein said contact brush means include a holder, and contact brushes supported by said holder; and wherein said holder is enveloped by said insulating casing means.

14. Electrical machine as claimed in claim 5 wherein said bearing shield has an opening; comprising a closure part closing said opening; wherein said holder has a portion projecting through said closure part to the outside, and a flange secured to said bearing shield and abutting said closure part and the outside of said bearing shield for securing said closure part.

15. Electrical machine as claimed in claim 14 wherein said closure part consists of an elastic material and is resiliently fitted into said opening.

16. Electrical machine as claimed in claim 11 wherein said cylindrical flange consists of a synthetic material.

17. Electrical machine as claimed in claim 16 wherein said rotor means include a rotor winding; wherein said circuit means include wires connected with said rotor winding and with said slip means, and being embedded in said synthetic material of said flange.

18. Electrical machine as claimed in claim 11 wherein said cylindrical flange and the edge of said bottom wall surrounding said circular opening form a circular gap; comprising a sealing ring closing said gap, and a holding ring holding said sealing ring and having first projections; and wherein said insulating casing means has second projections forming with said first projections bayonet attachments for holding said holding ring and said sealing ring.

19. Electrical machine as claimed in claim 18 wherein said bottom wall has a circular projection forming a circular groove with said holding ring; and wherein said sealing ring is fitted into said groove.

20. Electrical machine as claimed in claim 19 wherein said holding ring consists of an insulating material.

21. Electrical machine as claimed in claim 18 and including springs for arresting pairs of engaged first and second projections for preventing separation of the same.

22. Electrical machine as claimed in claim 11 wherein said housing structure includes a bearing shield having a curved shoulder; and wherein said insulating casing means includes a casing portion fitting into said curved shoulder.

23. Electrical machine as claimed in claim 22 and including sealing means for sealing the gap between said curved shoulder and said casing means.

24. Electrical machine as claimed in claim 23 wherein said bearing shield has a curved projecting rib forming said curved shoulder; and wherein said sealing means has a groove seated on said curved rib and engaging said casing means.

25. Electrical machine as claimed in claim 23 wherein said insulating casing means form a curved rim; and wherein said sealing means is seated on said rim and has a pair of sealing lips.

26. Electrical machine as claimed in claim 11 wherein said bottom wall includes projecting sleeves; comprising at least one cooling plate; and rivets mounting said cooling plate on said sleeves and passing through said sleeves.

27. Electrical machine as claimed in claim 11 wherein said bottom wall has staggered projections; and comprising a flexible carrier plate tending to assume a normal position and being resiliently flexible, said carrier plate passing alternately about said staggered projections to be deformed to a wavy shape whereby said carrier plate is detachably mounted on said insulating casing; and rectifying diodes mounted on said carrier plate.

* * * * *